(12) United States Patent
Lin et al.

(10) Patent No.: US 12,235,510 B2
(45) Date of Patent: Feb. 25, 2025

(54) OPTICAL ELEMENT DRIVING MECHANISM

(71) Applicant: TDK TAIWAN CORP., Taoyuan (TW)

(72) Inventors: Yi-Chieh Lin, Taoyuan (TW);
Sheng-Zong Chen, Taoyuan (TW);
Shou-Jen Liu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 680 days.

(21) Appl. No.: 17/521,530

(22) Filed: Nov. 8, 2021

(65) Prior Publication Data

US 2022/0146780 A1 May 12, 2022

Related U.S. Application Data

(60) Provisional application No. 63/111,276, filed on Nov. 9, 2020.

(51) Int. Cl.
*G02B 7/02* (2021.01)
*G02B 7/04* (2021.01)

(52) U.S. Cl.
CPC ............... *G02B 7/023* (2013.01); *G02B 7/04* (2013.01)

(58) Field of Classification Search
CPC . G02B 7/023; G02B 7/04; G02B 7/09; G02B 13/36; G02B 27/646; G02B 26/0816; G02B 26/0883; G03B 30/00; G03B 2205/0069; G03B 5/00; H02K 41/0356
See application file for complete search history.

(56) References Cited

U.S. PATENT DOCUMENTS

| | | | |
|---|---|---|---|
| 12,105,348 B2 * | 10/2024 | Min | G02B 7/08 |
| 2016/0178924 A1 * | 6/2016 | Lim | G02B 7/08 359/557 |
| 2016/0373000 A1 * | 12/2016 | Park | G02B 27/646 |
| 2019/0170967 A1 * | 6/2019 | Jung | G02B 7/105 |
| 2020/0050014 A1 * | 2/2020 | Park | H04N 23/687 |

\* cited by examiner

*Primary Examiner* — George G. King
*Assistant Examiner* — Anna Smith
(74) *Attorney, Agent, or Firm* — MUNCY, GEISSLER, OLDS & LOWE, P.C.

(57) ABSTRACT

An optical element driving mechanism is provided. The optical element driving mechanism includes a movable portion, a fixed portion, a first driving assembly, and a circuit assembly. The movable portion is used for connecting to an optical element. The movable portion is movable relative to the fixed portion. The first driving assembly is used for driving the movable portion to move relative to the fixed portion. The circuit assembly is used for connecting to an external circuit, and is affixed on the fixed portion.

20 Claims, 18 Drawing Sheets

OPTICAL ELEMENT DRIVING MECHANISM

CROSS REFERENCE TO RELATED APPLICATIONS

This application claims the benefit of U.S. Provisional Application No. first sensing element 63/111,276, filed on Nov. 9, 2020, the entirety of which is incorporated by reference herein.

BACKGROUND OF THE DISCLOSURE

Field of the Disclosure

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include a driving mechanism to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the driving mechanism and how to increase its durability has become an important issue.

SUMMARY OF DISCLOSURE

An optical element driving mechanism is provided in some embodiments of the present disclosure. The optical element driving mechanism includes a movable portion, a fixed portion, a first driving assembly, and a circuit assembly. The movable portion is used for connecting to an optical element. The movable portion is movable relative to the fixed portion. The first driving assembly is used for driving the movable portion to move relative to the fixed portion. The circuit assembly is used for connecting to an external circuit, and is affixed on the fixed portion.

In some embodiments, the fixed portion includes a case and a bottom, the case has a top wall a side wall. The top wall and the side wall are plate-shaped, and the top wall and the side wall are not parallel. An accommodating space is formed between the case and the bottom and is used for accommodating the movable portion. The circuit assembly is disposed on the bottom. The fixed portion is used for corresponding to an optical sensing module.

In some embodiments, the optical element driving mechanism further includes a first sensing assembly used for detecting the movement, wherein the first sensing assembly includes a first reference object, a first sensing element corresponding to the first reference object, and a first control element used for providing a first driving signal to the first driving assembly. The first sensing element provides a first sensing signal to the first control element. The first sensing element and the first control element are packaged in a first package. The first reference object is disposed on one of the movable portion and the fixed portion, and the first package is disposed on another one of the movable portion and the fixed portion.

In some embodiments, wherein the bottom includes a main body, wherein the material of the main body includes plastic, and a first recess corresponding to the first sensing element. The main body is plate-shaped and is perpendicular to a main axis. The first recess includes a first inclined surface, wherein the first inclined surface is planar and is not perpendicular to the main axis. The first inclined surface is not parallel to the main axis.

In some embodiments, the bottom further includes a first opening, wherein light passes through the first opening to reach the optical sensing module, a light shielding portion disposed on the first opening and corresponding to the light, and a second opening. The light passes through the second opening to reach the optical sensing module; wherein: an angle between the first inclined surface and the main axis is between 15 degrees and 75 degrees. A first inner surface of the first opening is parallel to the main axis and surrounds the light. A chamfer of the first opening connects to the first inner surface. The surface of the chamfer is not parallel nor perpendicular to the main axis. The light shielding portion is adjacent to the first opening.

In some embodiments, a second inner surface of the light shielding portion is parallel to the main axis and surrounds the light. When viewed along the main axis, the shape of the first inner surface is different from the shape of the second inner surface. When viewed along the main axis, the maximum dimension of the first inner surface is greater than the maximum dimension of the second inner surface.

In some embodiments, in the main axis, a sum of the maximum dimensions of the first inner surface and the chamfer is greater than the maximum dimension of the second inner surface. The light shielding portion is between the first opening and the second opening; a third inner surface of the second opening is parallel to the main axis and surrounds the light. When viewed along the main axis, the shape of the first inner surface is different from the shape of the third inner surface. In the main axis, the maximum dimension of the first inner surface is less than the maximum dimension of the third inner surface.

In some embodiments, the second opening is used for accommodating a light filter. The light filter is affixed on the fixed portion by a first connecting element. The light shielding includes a connecting strengthen structure corresponding to the light filter. The connecting strengthen structure has a recessed structure.

In some embodiments, a disposing portion of the light shielding portion corresponds to a particle-capturing element. The material of the particle-capturing element includes polymer. The surface of the particle-capturing element is adhesive, and is used for capturing a particle. The disposing portion has a recessed structure.

In some embodiments, the circuit assembly includes: a first circuit disposed on a surface of the bottom, a second circuit disposed on the surface of the bottom, a third circuit disposed on the surface of the bottom, and a fourth circuit disposed on the surface of the bottom. The optical element driving mechanism further includes a second sensing assembly, including a second sensing element.

In some embodiments, the first circuit is disposed on the first inclined surface. The first circuit is electrically connected to the first sensing element. The second circuit is electrically connected to the first sensing element. When viewed along the main axis, the optical element driving mechanism is polygonal. The third circuit is electrically connected to the second sensing element. The second sensing assembly is used for detecting the movement of the movable portion relative to the fixed portion.

In some embodiments, the fourth circuit is electrically connected to the second sensing element. The length of the first circuit is less than the length of the second circuit. The length of the third circuit is greater than the length of the fourth circuit. The length of the first circuit is greater than the length of the fourth circuit. The length of the second circuit is less than the length of the third circuit.

In some embodiments, the circuit assembly further includes a first extrinsic circuit extending in a direction that is not perpendicular to the main axis, a second extrinsic circuit extending in a direction that is not perpendicular to the main axis, a third extrinsic circuit extending in a direction that is not perpendicular to the main axis, and a fourth extrinsic circuit extending in a direction that is not perpendicular to the main axis.

In some embodiments, the first extrinsic circuit is disposed on a surface of the bottom. The first circuit is electrically connected to an external circuit through the first extrinsic circuit. The second extrinsic circuit is disposed on a surface of the bottom. The second circuit is electrically connected to the external circuit through the second extrinsic circuit.

In some embodiments, when viewed along the main axis, the first extrinsic circuit is disposed on a first side of the optical element driving mechanism. When viewed along the main axis, the second extrinsic circuit is disposed on a second side of the optical element driving mechanism. The third extrinsic circuit is disposed on a surface of the bottom. When viewed along the main axis, the third extrinsic circuit is disposed on the first side. The third circuit is electrically connected to the external circuit through the third extrinsic circuit.

In some embodiments, the fourth extrinsic circuit is disposed on a surface of the bottom. The fourth circuit is electrically connected to the external circuit through the fourth extrinsic circuit. When viewed along the main axis, the fourth extrinsic circuit is disposed on the second side. When viewed along the main axis, the first sensing element is disposed at a third side of the optical element driving mechanism. The first side is parallel to the second side. The third side is not parallel to the second side. When viewed along the main axis, the second sensing element is disposed on the second side.

In some embodiments, the circuit assembly further includes a fifth circuit electrically connected to the first driving assembly, a first internal contact exposed from a recess of the bottom, and a first protruding structure protruding from the first internal contact.

In some embodiments, the material of the first protruding structure includes metal. The first driving assembly is electrically connected to the fifth circuit through the first protruding structure. The first driving assembly is electrically connected to the first control element through the fifth circuit.

In some embodiments, the optical sensing module includes a substrate and an optical sensor. The bottom is disposed on the substrate. The optical sensor is disposed on the substrate. The first extrinsic circuit extends to the substrate. The first extrinsic circuit includes a first segment and a second segment that are not parallel each other. The second segment is closer to the substrate than the first segment. The main body has a shrinking structure corresponding to the second segment.

In some embodiments, the optical element driving mechanism further includes a circuit component. The first driving assembly includes a first coil. The circuit component is used for accommodating the first coil. The circuit component includes a third opening corresponding to the light. When viewed along the main axis, the third opening is greater than the first opening. The bottom is in contact with the substrate; a minimum distance between the first extrinsic circuit and the substrate is less than 0.2 mm. The first segment is parallel to the main axis. The second segment is not parallel to the main axis.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF DISCLOSURE

Figure 1:
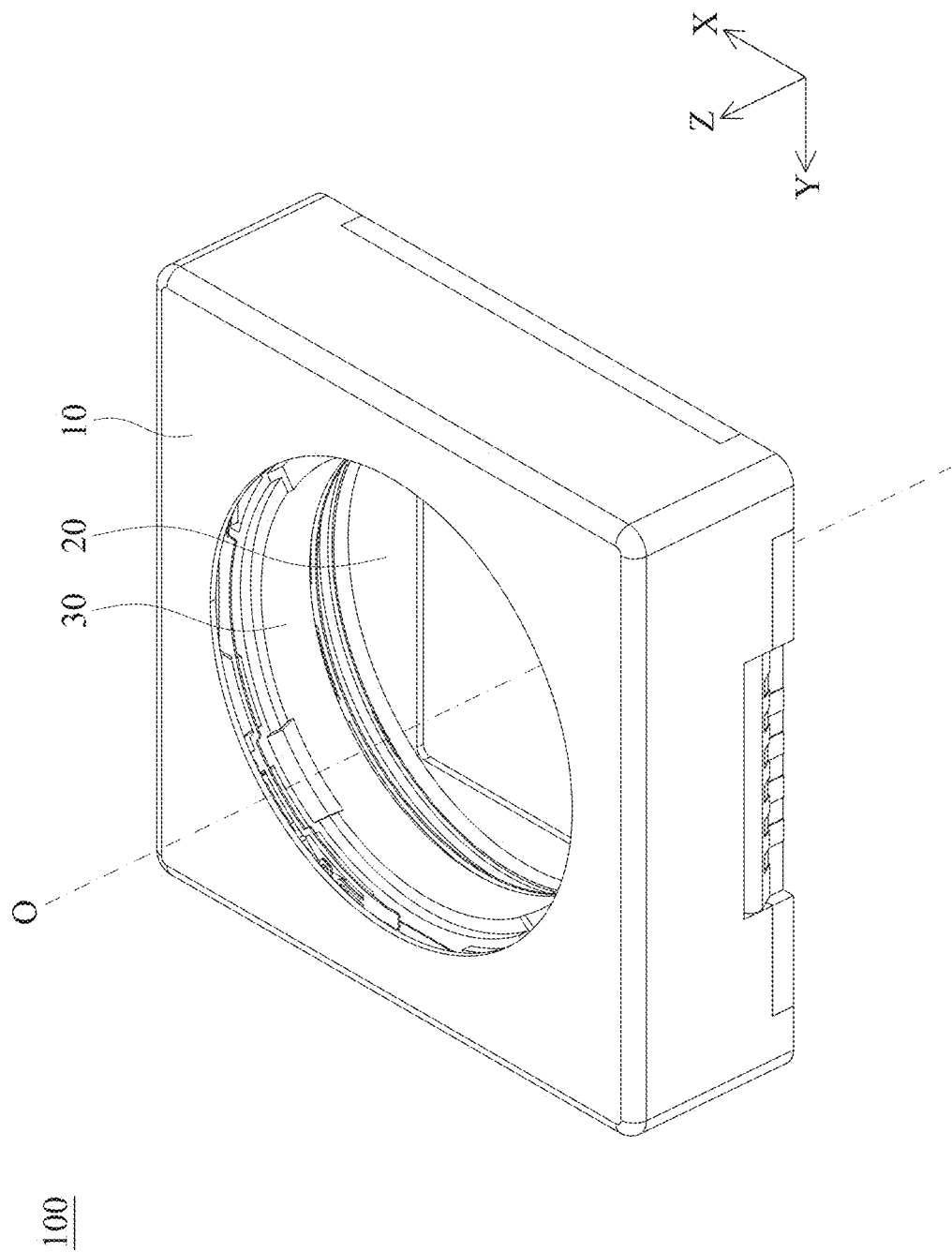
FIG. 1 is a schematic view of an optical element driving mechanism in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, in some embodiments, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
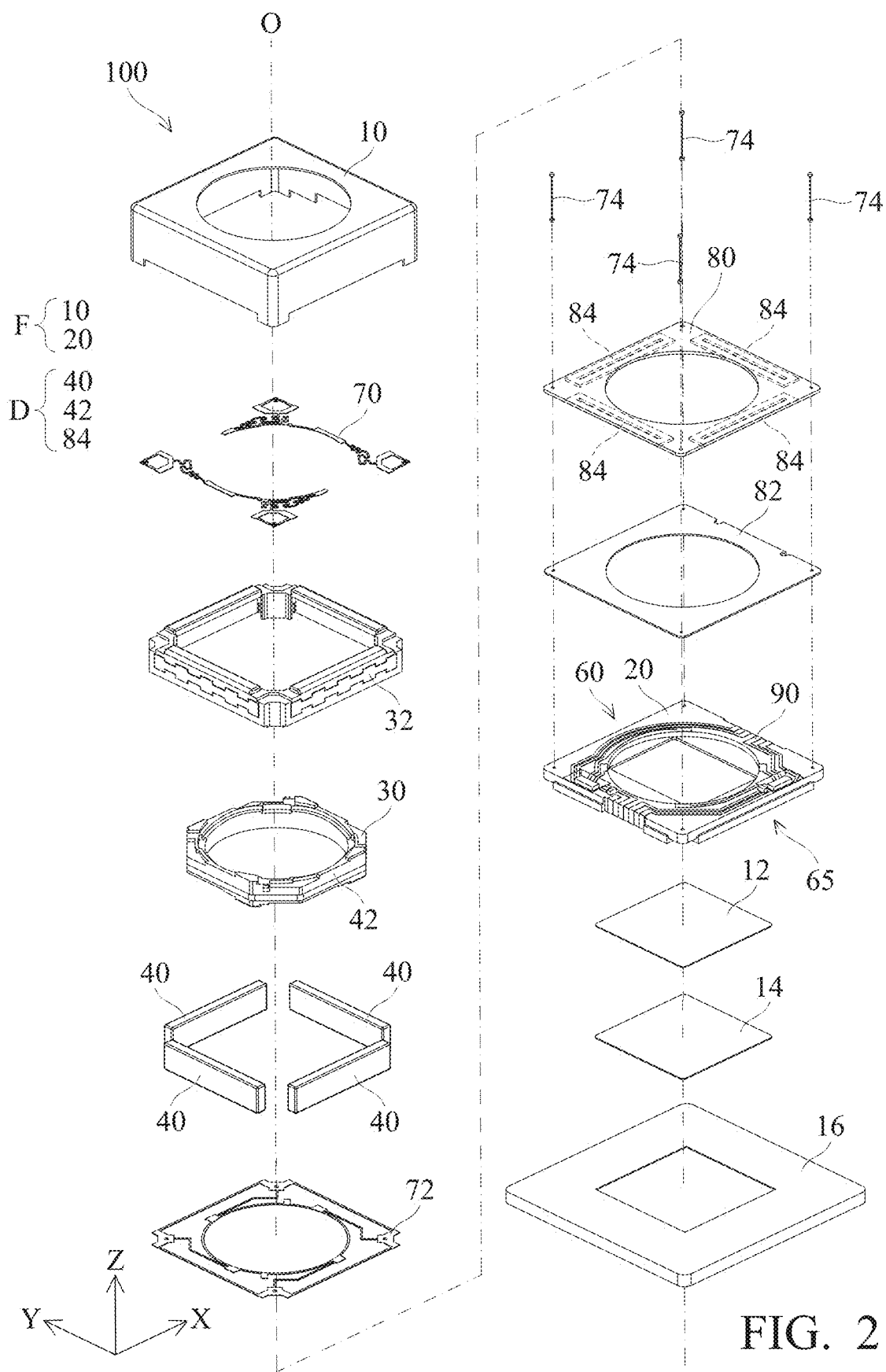
FIG. 2 is an exploded view of the optical element driving mechanism.
Figure 3:
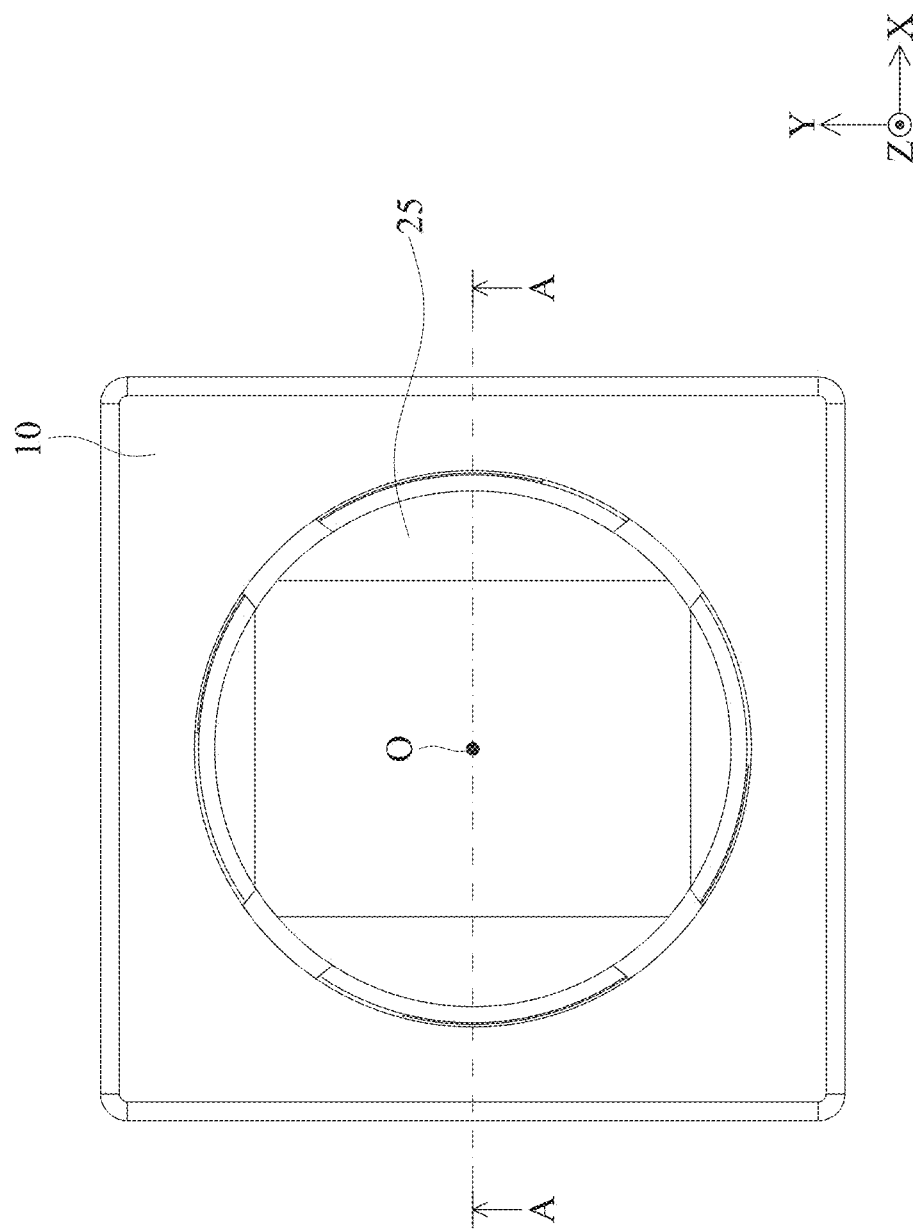
FIG. 3 is a top view of the optical element driving mechanism.
Figure 4:
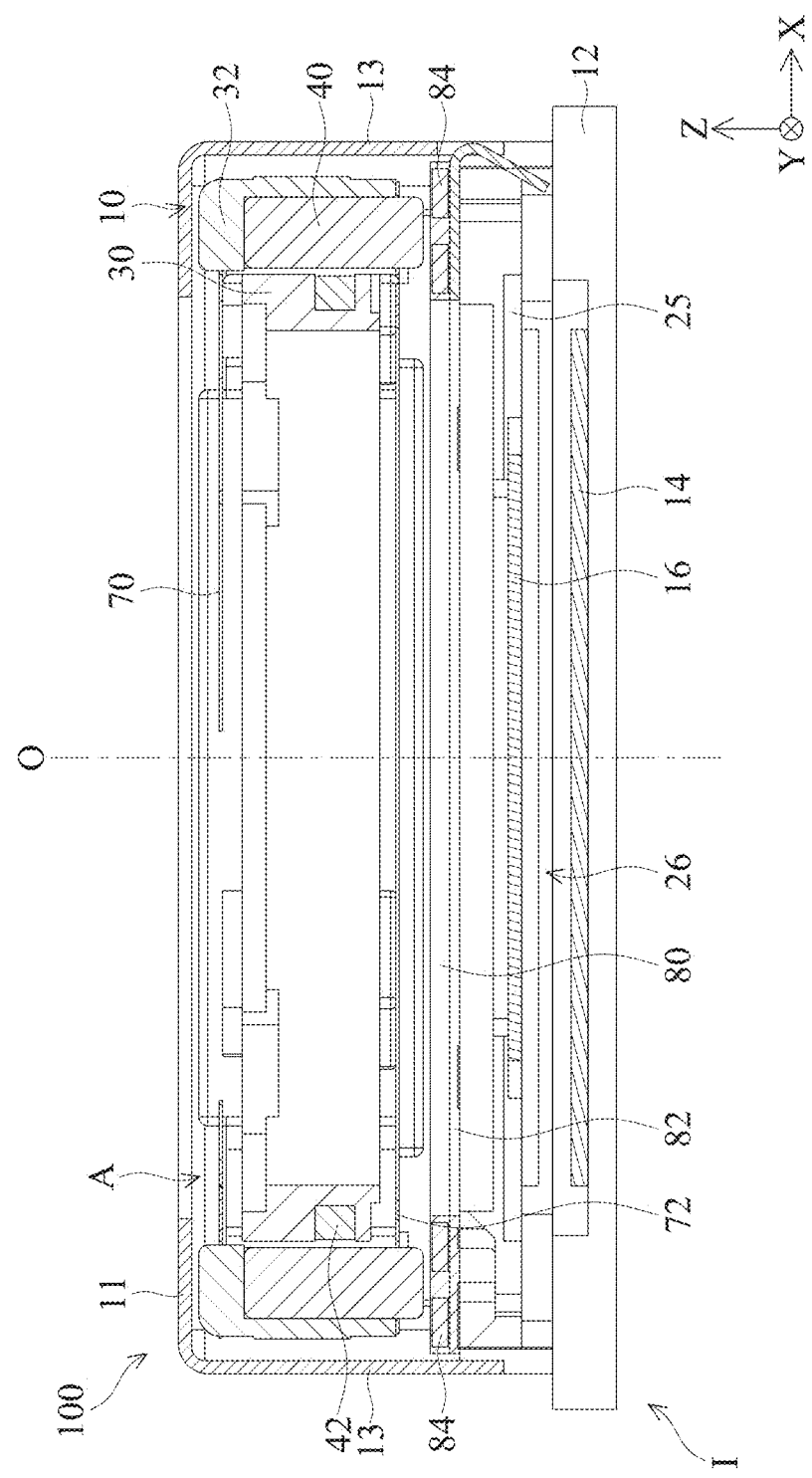
FIG. 4 is a cross-sectional view illustrated along the line A-A in FIG. 3.

Please see FIG. 1 to FIG. 4 at advance. FIG. 1 is a schematic view of an optical element driving mechanism 100 in some embodiments of the present disclosure. FIG. 2 is an exploded view of the optical element driving mechanism 100. FIG. 3 is a top view of the optical element driving mechanism 100. FIG. 4 is a cross-sectional view illustrated along the line A-A in FIG. 3.

The optical element driving mechanism 100 may be used for driving an optical element, such as a lens, a mirror, a prism, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure.

As shown in FIG. 1 to FIG. 4, in some embodiments, the optical element driving mechanism 100 mainly includes a case 10, a bottom 20, a movable portion 30, a frame 32, a driving magnetic element 40, a second driving coil 42, a first sensing assembly 60, a second sensing assembly 65, a first resilient element 70, a second resilient element 72, a third resilient element 74, a circuit component 80, a circuit board 82, and a circuit assembly 90 arrange along a main axis O. In some embodiments, the optical element driving mechanism 100 (e.g. the fixed portion F) may be used for corresponding to an optical sensing module I, the optical sensing module I may include a substrate 12, an optical sensing element 14, and light filter 16.

As shown in FIG. 4, the case 10 may include a top wall 11 and a side wall 13, and the side wall 13 may extend along edges of the top wall 11. The top wall 11 and the side wall 13 may have plate-shaped structures, and are not parallel to each other. For example, the top wall 11 may be perpendicular to the Z direction, and the side wall 13 may be perpendicular to the X direction or the Y direction.

The case 10 and the bottom 20 may be called together as a fixed portion F, and the case 10 and the bottom 20 may be combined to form a shell of the optical element driving mechanism 100. For example, an accommodating space A may be formed between the case 10 and the bottom 20, and the movable portion 30 may be disposed in the accommodating space A. It should be noted that the case 10 and the bottom 20 have openings, the opening of the case 10 corresponds to the main axis O of the optical element, and the opening of the bottom 20 corresponds to the optical sensing element 14 disposed outside the optical element driving mechanism 100. Therefore, the optical element disposed in the optical element driving mechanism 100 may perform focus with the optical sensing element 14 along the main axis O. In some embodiments, the bottom 20 may be in direct contact with the substrate 12, and the optical sensing element 14 may be disposed on the substrate 12.

The movable portion 30 has a through hole, and the optical element may be fixed in the through hole. (e.g. by screwing or gluing). The frame 32 is disposed in the case 10 and the bottom 20, and the movable portion 30 is disposed in the frame 32. The driving magnetic element 40 and the second driving coil 42 may be called as a first driving assembly D, which is used for driving the movable portion 30 to move relative to the fixed portion F. In some embodiments, the driving magnetic element 40 is disposed on the fixed portion F, and the second driving coil 42 is winding on an external surface of the movable portion 30, or their positions may be interchanged, depending on design requirement. The interaction between the driving magnetic element 40 and the second driving coil 42 generates a magnetic force to move the movable portion 30 relative to the frame 32 or relative to the fixed portion F along the main axis O, so auto focus (AF) or optical image stabilization (OIS) may be achieved. In some embodiments, the first driving assembly D may include other driving elements, such as piezoelectric elements or shape memory alloy elements.

In this embodiment, the first sensing assembly 60 and the second sensing assembly 65 may be disposed on the bottom 20 and the movable portion 30, and the movable portion 30 and the optical element in the movable portion 30 are movably disposed in the frame 32. More specifically, the movable portion 30 may be connected to the frame 32 and suspended in the frame 32 by a first resilient element 70 and a second resilient element 72 made by metal. The first resilient element 70 and the second resilient element 72 may be springs. When current is applied to the second driving coil 42, the second driving coil 42 may interact with the driving magnetic element 40 to generate an electromagnetic force to drive the movable portion 30 moving relative to the frame 32 along the main axis O to achieve auto focus. For example, the driving magnetic element 40 may include at least one multipole magnet to interact with the second driving coil 42, so the movable portion 30 may be moved along the main axis O and perform focus.

In some embodiments, the first driving assembly D may further include a first driving coil 84 disposed in the circuit component 80. In other words, the circuit component 80 may be used for accommodating the first driving coil 84. The circuit component 80 may be plate-shaped, and may be perpendicular to the main axis O. Moreover, the circuit component 80 may be disposed on the circuit board 82. The circuit board 82 may be a flexible printed circuit (FPC), which may be adhered on the bottom 20. In this embodiment, the circuit board 82 is electrically connected to other electronic elements disposed inside or outside the optical element driving mechanism 100. For example, electrical circuit may be transferred to the first driving coil 84 and the second driving coil 42 from the circuit board 82 through the first resilient element 70, the second resilient element 72, or the third resilient element 74, so the movement of the movable portion 30 relative to the fixed portion F in the X, Y, Z directions may be controlled. Therefore, auto focus or optical image stabilization may be achieved.

The circuit assembly 90 may be connected to an external circuit (not shown) to allow the optical element driving mechanism 100 electrically connected to external devices. The circuit assembly 90 may be affixed on the bottom 20 (the fixed portion F), such as may be formed on the surface of the bottom 20 by Laser Direct Structuring (LDS). Therefore, the height of the bottom 20 and the circuit assembly 90 may be reduced to achieve miniaturization. For example, the thickness of the circuit assembly 90 may be between about 0.01 mm to about 0.03 mm. Moreover, the circuit component 80 and the circuit board 82 may cover on the circuit assembly 90 to protect the circuit assembly 90 from being damaged.

Figure 5:
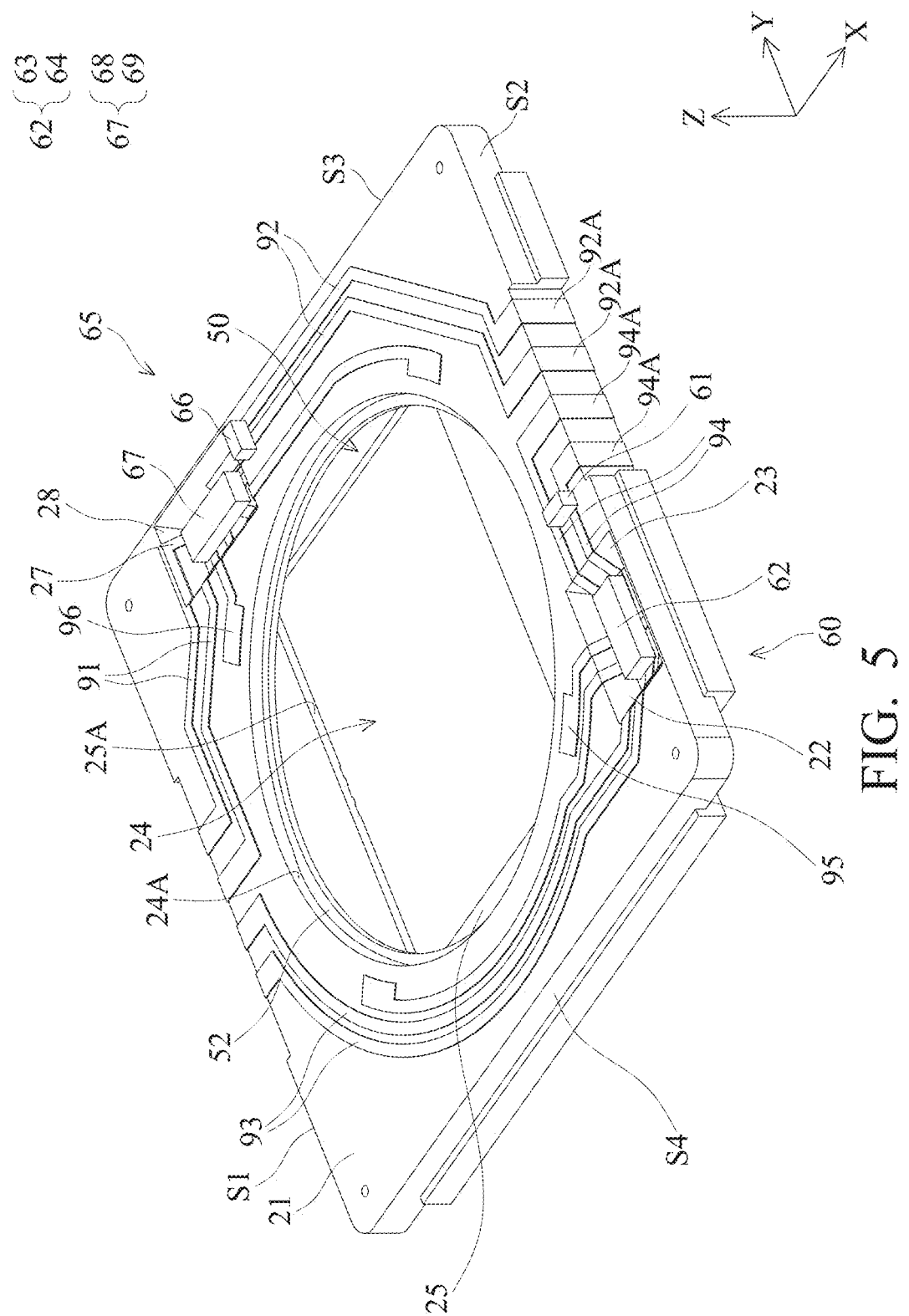
FIG. 5 is a schematic view of some elements of the optical element driving mechanism.
Figure 6:
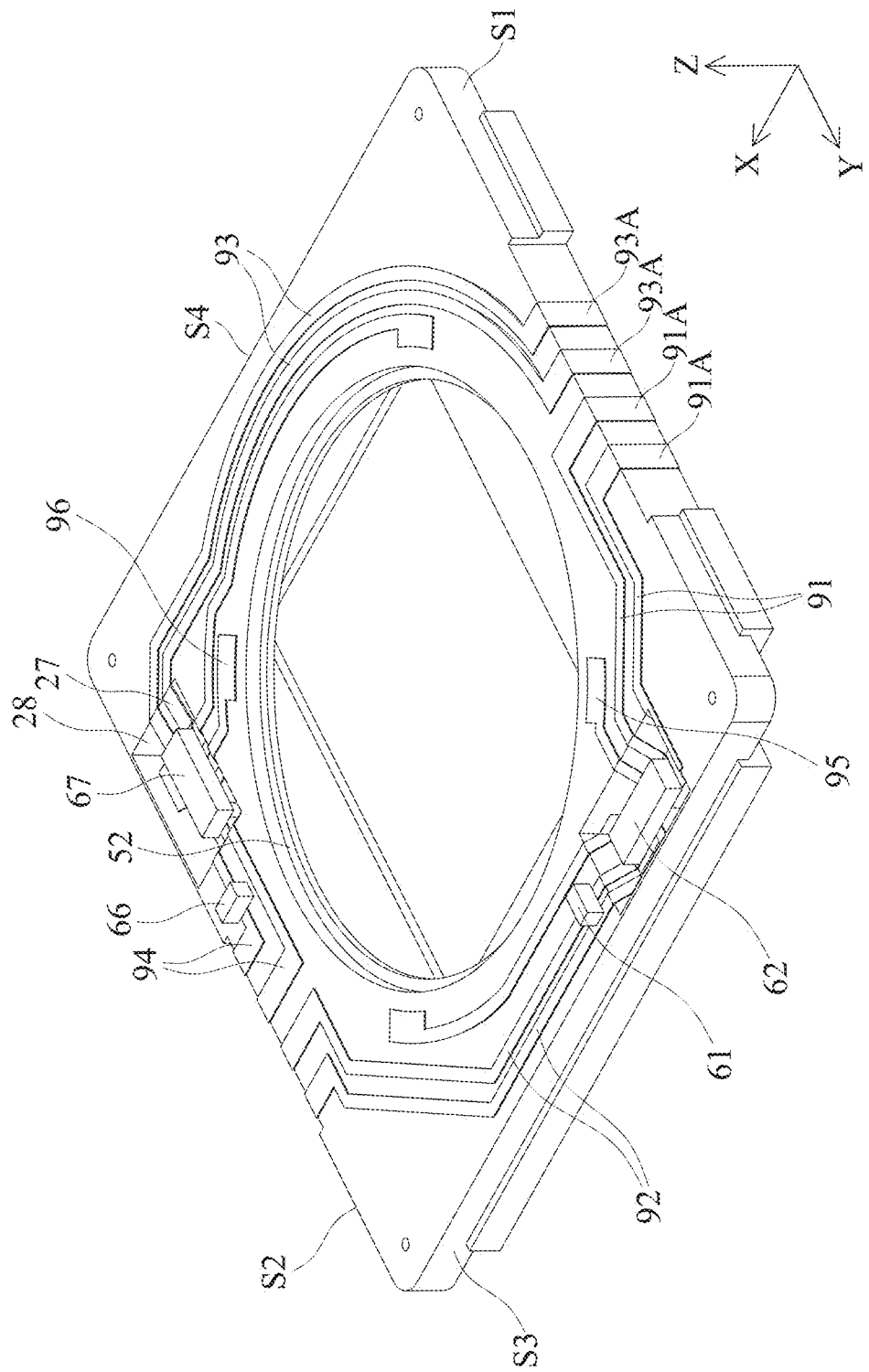
FIG. 6 is a schematic view of some elements of the optical element driving mechanism.
Figure 7:
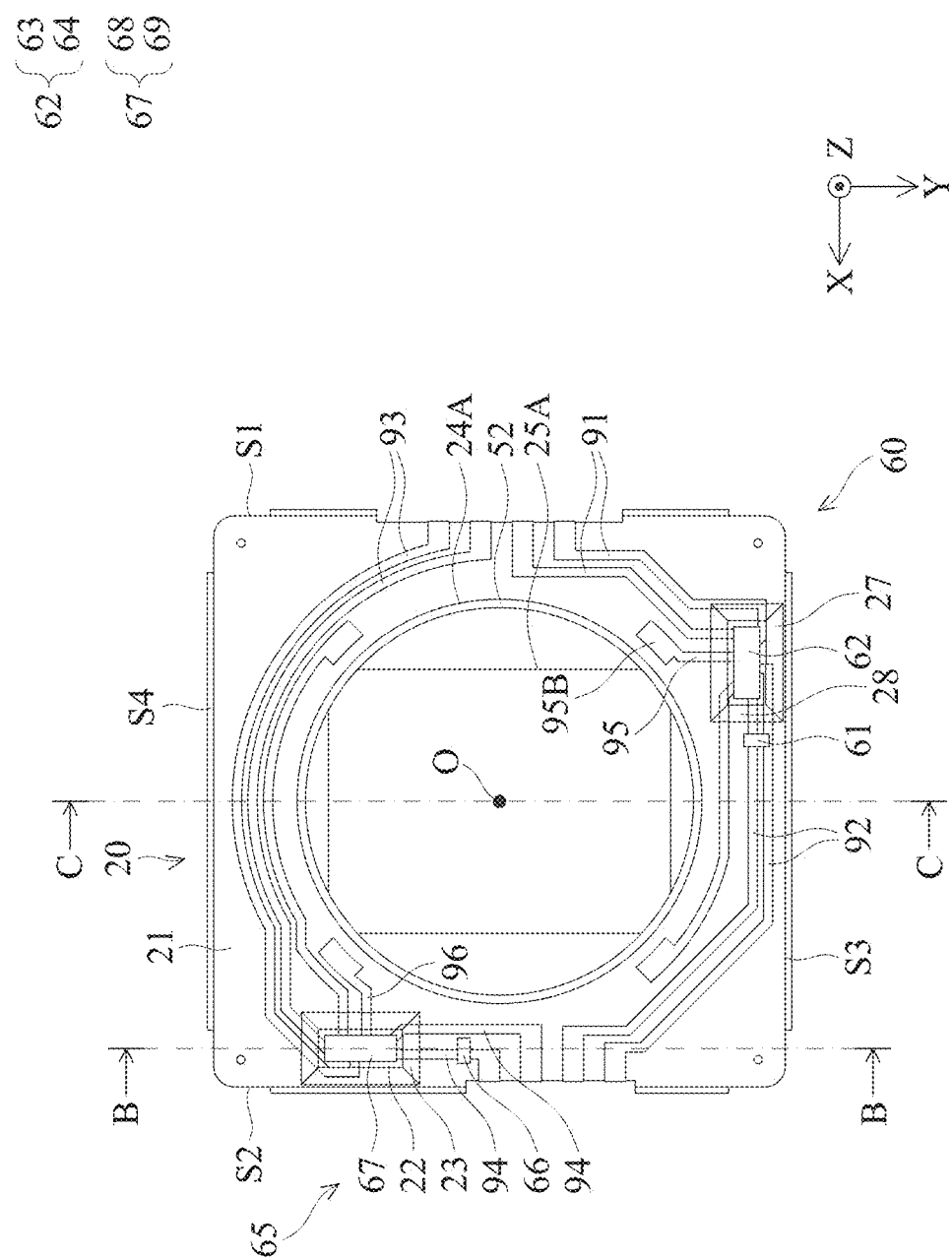
FIG. 7 is a top view of some elements of the optical element driving mechanism.

FIG. 5 is a schematic view of some elements of the optical element driving mechanism 100. FIG. 6 is a schematic view of some elements of the optical element driving mechanism 100. FIG. 7 is a top view of some elements of the optical element driving mechanism 100. In some embodiments, FIG. 5 to FIG. 7 mainly show the bottom 20, the first sensing assembly 60, the second sensing assembly 65, and the circuit assembly 90.

In some embodiments, the first sensing assembly 60 may include a first reference object 61 and a first package 62 disposed on the movable portion 30 and the fixed portion F, and the second sensing assembly 65 may include a second reference object 66 and a second package 67 disposed on the movable portion 30 and the fixed portion F. In some embodiments, the first package 62 may include a first sensing element 63 and a first control element 64, and the second package 67 may include a second sensing element 68 and a second control element 69. In some embodiments, the first sensing assembly 60 and the second sensing assembly 65 may be used for detecting the movement of the movable portion 30 relative to the fixed portion F in different directions.

In some embodiments, the first reference object 61 may be disposed on the movable portion 30 (FIG. 5 to FIG. 7 only show the position of the first reference object 61 relative to other elements), and the first sensing element 63 may be disposed on the bottom 20 (the fixed portion F) and corresponds to the first reference object 61. For example, in some embodiments, the first reference object 61 may be a magnet for generating magnetic field, and when the movable portion 30 moves relative to the fixed portion F, the first sensing element 63 may detect the change of the magnetic field generated by the first reference object 61 to get the position of the movable portion 30 relative to the fixed portion F. Therefore, in some embodiments, the first sensing element 63 may provide a first sensing signal to the first control element 64, and the first control element 64 may provide a first driving signal to the first driving assembly D according to the first sensing signal to control the way that the first driving assembly D drives the movable portion 30. In some embodiments, the first sensing element 63 and the first control element 64 are packaged in the first package 62 to reduce the required volume, and miniaturization may be achieved. In some embodiments, the position of the first reference object 61 and the first package 62 may be interchanged. In other words, the first reference object 61 may be disposed on the fixed portion F, and the first package 62 may be disposed on the movable portion 30, depending on design requirement.

In some embodiments, the second reference object 66 may be disposed on the movable portion 30 (FIG. 5 to FIG. 7 only show the position of the second reference object 66 relative to other elements), and the second sensing element 68 may be disposed on the bottom 20 (the fixed portion F) and corresponds to the second reference object 66. For example, in some embodiments, the second reference object 66 may be a magnet for generating magnetic field, and when the movable portion 30 moves relative to the fixed portion F, the second sensing element 68 may detect the change of the magnetic field generated by the second reference object 66 to get the position of the movable portion 30 relative to the fixed portion F. Therefore, in some embodiments, the second sensing element 68 may provide a first sensing signal to the second control element 69, and the second control element 69 may provide a first driving signal to the first driving assembly D according to the first sensing signal to control the way that the first driving assembly D drives the movable portion 30. In some embodiments, the second sensing element 68 and the second control element 69 are packaged in the second package 67 to reduce the required volume, and miniaturization may be achieved. In some embodiments, the position of the second reference object 66 and the second package 67 may be interchanged. In other words, the second reference object 66 may be disposed on the fixed portion F, and the second package 67 may be disposed on the movable portion 30, depending on design requirement.

In some embodiments, the first sensing element 63 and the second sensing element 68 may include a Hall sensor, a magnetoresistance effect sensor (MR sensor), a giant magnetoresistance effect sensor (GMR sensor), a tunneling magnetoresistance effect sensor (TMR sensor), or a fluxgate sensor. In some embodiments, the first sensing element 63 and the second sensing element 68 may be disposed on adjacent sides of the optical element driving mechanism 100 to detect the movement of the movable portion 30 relative to the fixed portion F in different directions.

Figure 8A:
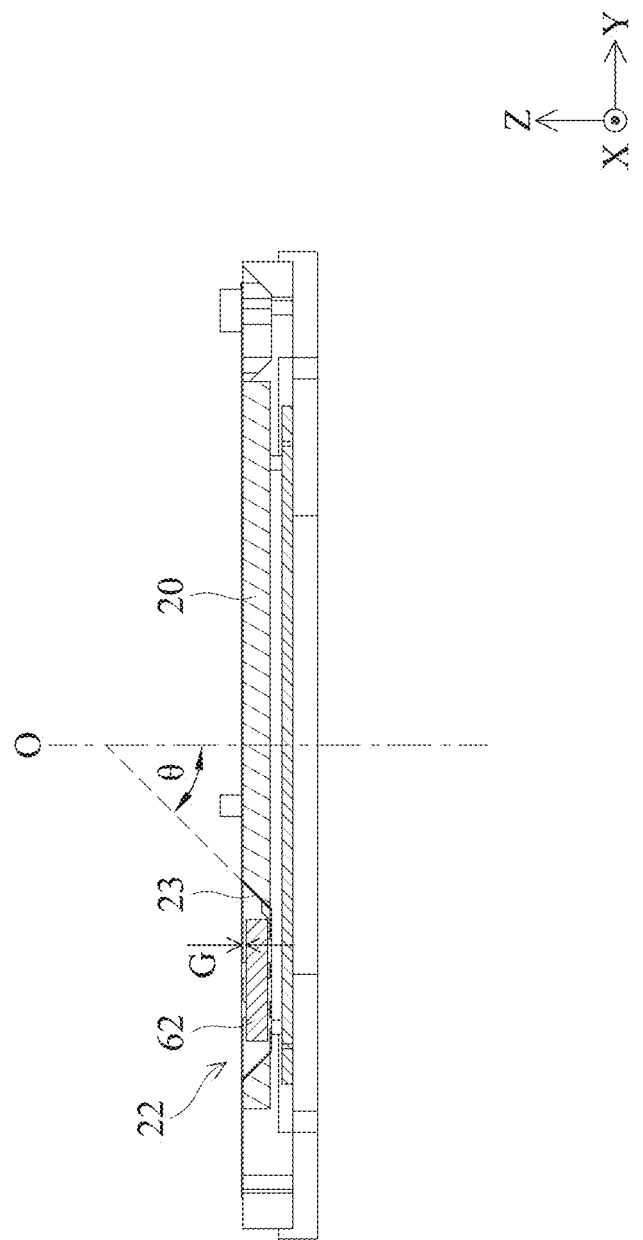
FIG. 8A is a cross-sectional view illustrated along the line B-B in FIG. 7.
Figure 8B:
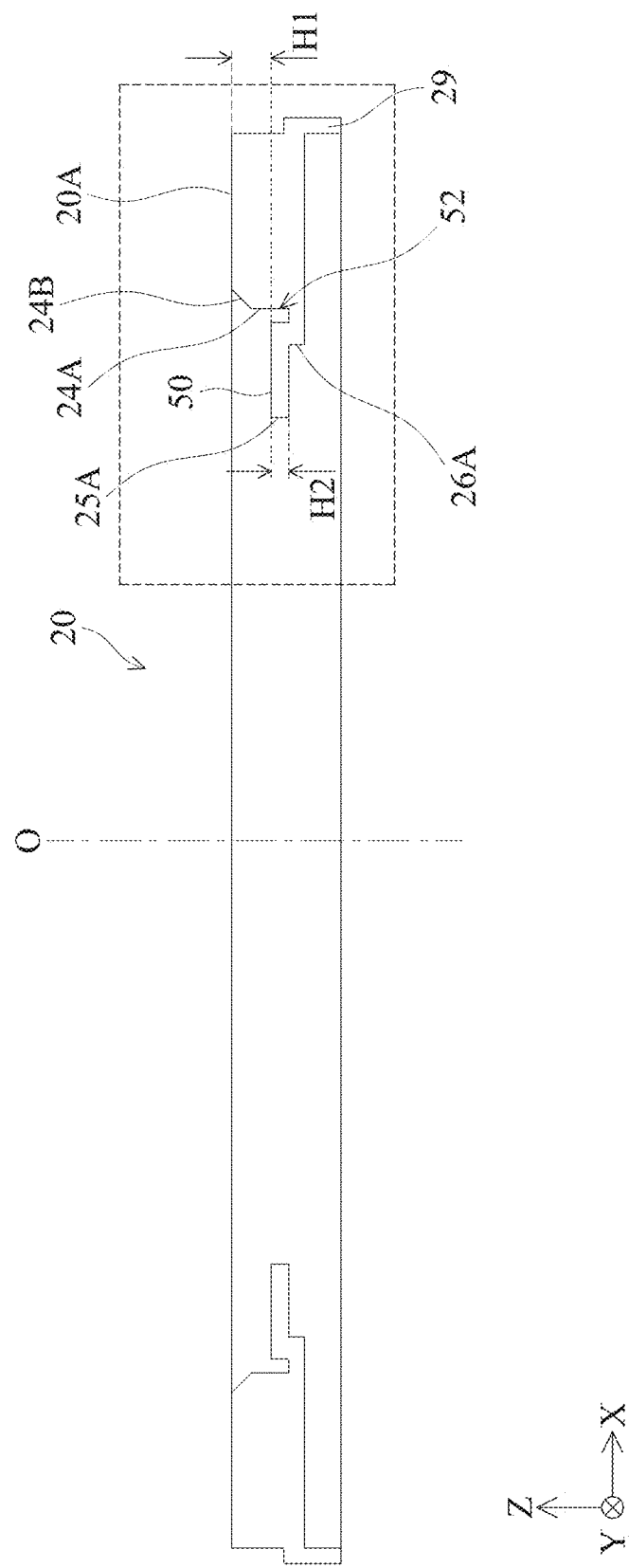
FIG. 8B is a cross-sectional view illustrated along the line C-C in FIG. 7.
Figure 8C:
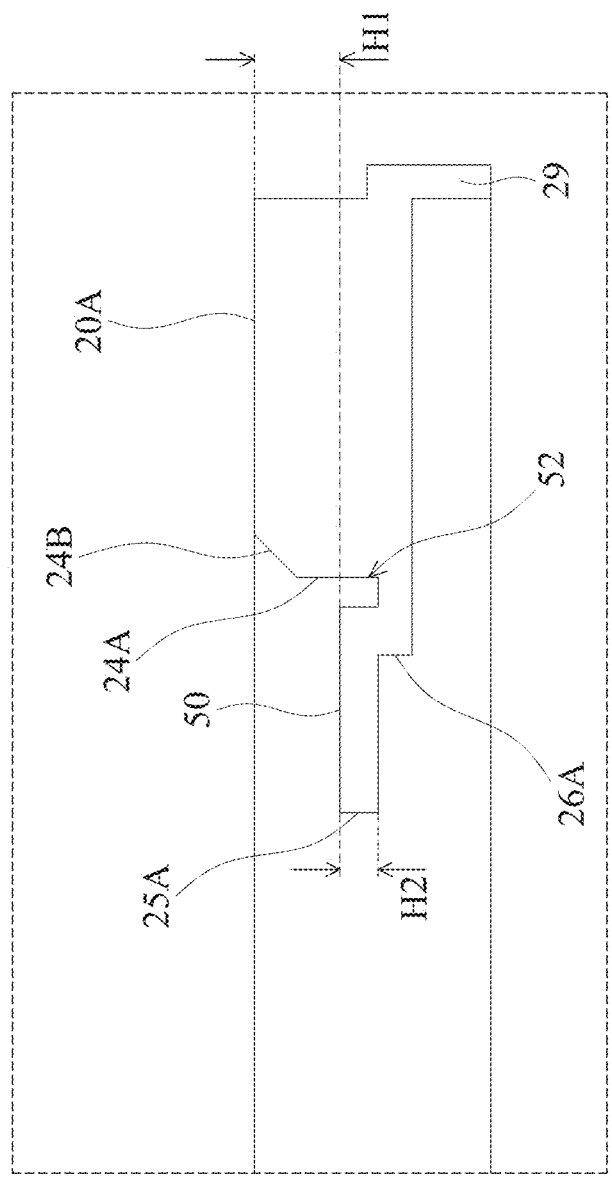
FIG. 8C is an enlarged view of FIG. 8B

FIG. 8A is a cross-sectional view illustrated along the line B-B in FIG. 7. FIG. 8B is a cross-sectional view illustrated along the line C-C in FIG. 7. FIG. 8C is an enlarged view of FIG. 8B. In some embodiments, the bottom 20 may include a main body 21. The main body 21 may include plastic, be plate-shaped, and perpendicular to the main axis O. Moreover, a first recess 22 and a second recess 27 are formed on the main body 21 and corresponding to the first package 62 (which includes the first sensing element 63 and the first control element 64) and the second package 67 (which includes the second sensing element 68 and the second control element 69), respectively. In some embodiments, the first recess 22 include a first inclined surface 23 which has planar structure and is not parallel nor perpendicular to the main axis O. For example, as shown in FIG. 8, when viewed in the X direction, an angle θ between the first inclined surface 23 and the main axis O may between 15 to 75 degrees. Moreover, in some embodiments, the first package 62 does not protrude from the first recess 22, such as lower than the first recess 22 by a gap G to protect the first package 62. In some embodiments, the second package 67 and the second recess 27 may have similar relationship, and does not repeat again.

Moreover, the bottom 20 may include a first opening 24 formed on the main body 21, used for allow light passing through the bottom 20 to reach the optical sensing module I. A first inner surface 24A of the first opening 24 is parallel to the main axis O, and the light is surrounded by the first inner surface 24A. The first opening 24 may further includes a chamfer 24B connected to the first inner surface 24A and the bottom 20A of the bottom 20. The surface of the chamfer 24B is not parallel nor perpendicular to the main axis O. Moreover, the bottom 20 may further include a light shielding portion 25 disposed on the first opening 24 (e.g. adjacent to the first opening 24). The light shielding portion 25 includes a second inner surface 25A parallel to the main axis O and surrounds the light. The light shielding portion 25 may be used for controlling the intensity or the shape of the light passing through the optical element driving mechanism 100 and reaching the optical sensing module I. In some embodiments, in the Z direction (the direction that the main axis extends), the sum of maximum dimensions of the first inner surface 24A and the chamfer 24B is the height H1, the maximum dimension of the second inner surface 25A is the height H2, and the height H1 is greater than the height H2. Therefore, the size of the light shielding portion 25 in the Z direction may be reduced to achieve miniaturization.

Figure 9:
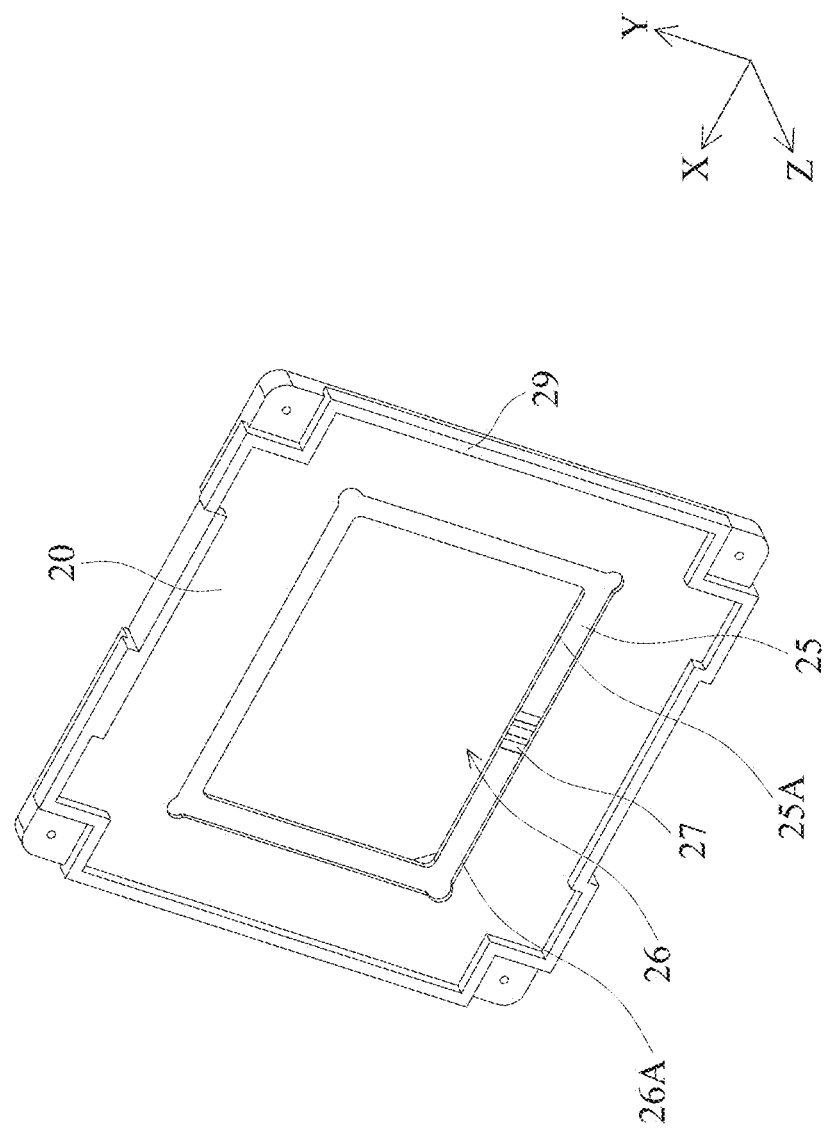
FIG. 9 is a schematic view of the bottom.

FIG. 9 is a schematic view of the bottom 20, wherein FIG. 5 and FIG. 6 show the front surface of the bottom 20, and FIG. 9 shows the back surface of the bottom 20. The bottom 20 may further include a second opening 26, wherein the light shielding portion 25 is between the first opening 24 and the second opening 26 to separate the first opening 24 and the second opening 26. The second opening 26 includes a third inner surface 26A parallel to the main axis O and surrounds the light. In other words, the light may sequentially pass through the first opening 24, the light shielding portion 25, and the second opening 26 to reach the optical sensing module I.

Figure 10:
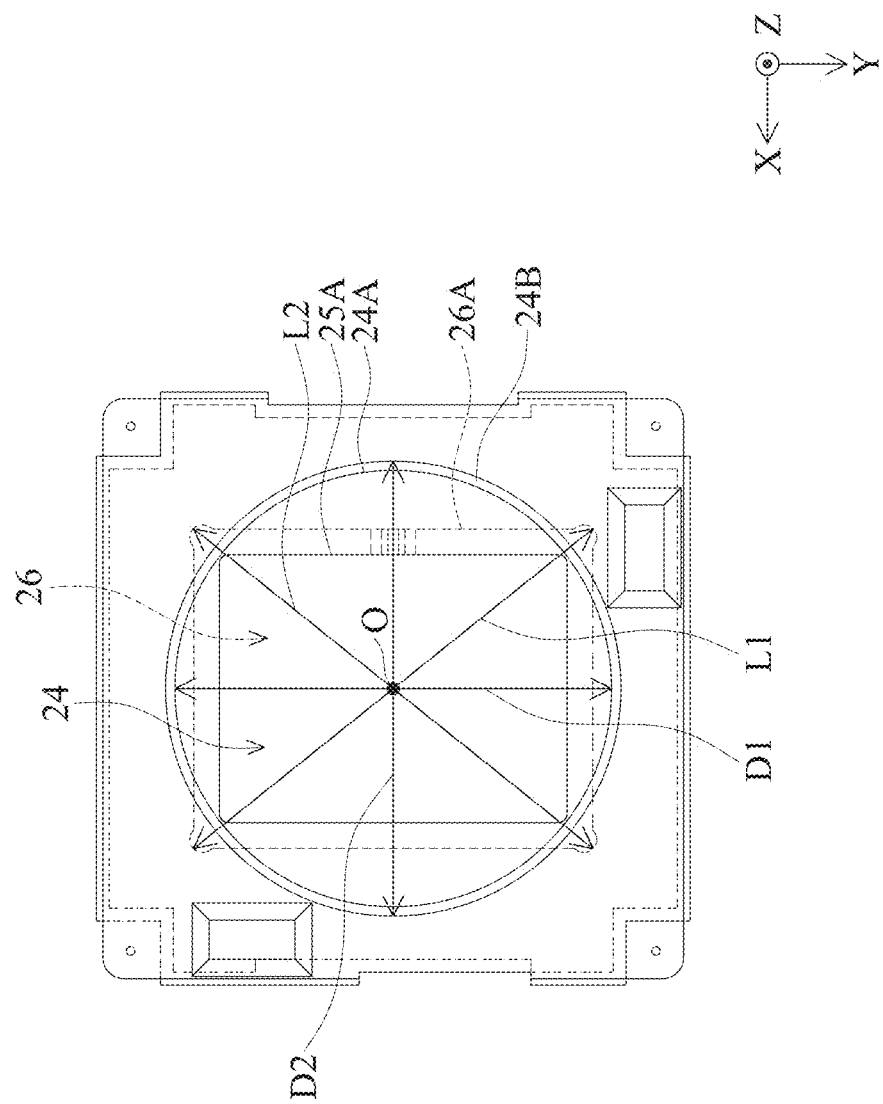
FIG. 10 is a schematic view of the bottom.

FIG. 10 is a schematic view of the bottom 20, wherein both sides of the bottom 20 are shown. In some embodiments, when viewed along the main axis O, the shape of the first inner surface 24A is different from the shapes of the second inner surface 25A and the third inner surface 26A. For example, when viewed along the main axis O, the first inner surface 24A is circular, and the second inner surface 25A and the third inner surface 26A are substantially rectangular. In some embodiments, when viewed along the main axis O, the maximum size of the first inner surface 24A is greater than the maximum size of the second inner surface 25A. For example, the circular first inner surface 24A may have a diameter D1, the diagonal of the rectangular second inner surface 25A may have a length L1, and the diameter D1 is greater than the length L1. In some embodiments, when viewed along the main axis O, the maximum size of the first inner surface 24A is less than the maximum size of the third inner surface 26A. For example, the diagonal of the rectangular second inner surface 25A may have a length L2, and the diameter D1 is less than the length L2.

In some embodiments, as shown in FIG. 4, the light filter 16 may be disposed in the second opening 26. The light filter 16 may be used for filtering the wavelength of the light passing through the light filter 16, so only light having a certain range of wavelength can pass through the light filter 16 and reach the optical sensing element 14. For example, in some embodiments, the light filter 16 may block light having infrared wavelength, and only light having other wavelength can pass through (e.g. visible light). In some embodiments, the light filter 16 may include glass. The light filter 16 may be affixed on the light shielding portion 25 by a first connecting element (not shown). The first connecting element may be adhesive, such as glue.

It should be noted that in some embodiments, the light shielding portion 25 may further include a second recess 27 corresponding to the light filter 16, such as at least partially overlap each other in the Z direction. For example, the second recess 27 may be a recess to increase the contact area between the first connecting element and the light shielding portion 25, so the strength of the adhesive may be increased. Moreover, a protruding portion 29 may form on a side of the bottom 20 facing away from the case 10. The protruding portion 29 is in direct contact with the substrate 12 to allow the light filter 16 disposed on the light shielding portion 25 and the optical sensing element 14 disposed on the substrate 12 separated from each other for a distance.

In some embodiments, as shown in FIG. 5, a disposing portion 52 may be formed on the light shielding portion 25, such as having a recess structure. The particle-capturing element 50 may be disposed on the light shielding portion 25 facing the case 10, and may disposed in the disposing portion 52. For example, the material of the particle-capturing element 50 may include polymer, and the particles in the optical element driving mechanism 100 may be collected by the particle-capturing element 50 by sticking, such as the particles generated from the collision of the elements in the optical element driving mechanism 100. Therefore, the particles may be prevented from reaching the optical sensing module I. Therefore, in some embodiments, the particle-capturing element 50 may increase the performance of the optical sensing module I. In some embodiments, the disposing portion 52 may have a wall-like structure to further limit the position of the particle-capturing element 50.

In some embodiments, the elements in the first package 62 and the second package 67 (the first sensing element 63, the first control element 64, the second sensing element 68, and the second control element 69) may be electrically connected to other external elements by the circuit assembly 90. For example, the first sensing element 63 and the first control element 64 of the first package 62 may be electrically connected to a first circuit 91 and a second circuit 92, and the second sensing element 68 and the second control element 69 of the second package 67 may be electrically connected to a third circuit 93 and a fourth circuit 94. As shown in FIG. 7, the bottom 20 of the optical element driving mechanism 100 may be polygonal, such as may have a first side S1, a second side S2, a third side S3, and fourth side S4. The first side S1 and the second side S2 may be parallel and on opposite sides of the bottom 20, and the first side S1 is adjacent to the third side S3 and the fourth side S4 and are not parallel to the third side S3 and the fourth side S4. For example, first side S1 is perpendicular to the third side S3 and the fourth side S4. The third side S3 and the fourth side S4 may be parallel.

In some embodiments, the first circuit 91 may be disposed on the first side S1 and the third side S3, the second circuit 92 may be disposed on the second side S2 and the third side S3, the third circuit 93 may be disposed on the first side S1, the second side S2, and the fourth side S4, and the fourth circuit 94 may be disposed on the second side S2. The first sensing element 63 and the first control element 64 of the first package 62 may be disposed on the third side S3, and the second sensing element 68 and the second control element 69 of the second package 67 may be disposed on the second side S2.

In some embodiments, the first circuit 91, the second circuit 92, the third circuit 93, and the fourth circuit 94 may be disposed on the surface of the bottom 20 (i.e. exposed from the bottom 20). Moreover, the first circuit 91 may be disposed on the surface of the first inclined surface 23. Since the angle θ between the first inclined surface 23 and the main axis O may be between 15 degrees and 75 degrees, the first circuit 91 may be disposed on the bottom 20 in a smooth way, so the first circuit 91 may be prevented from being damaged.

The first circuit 91 may be connected to the first extrinsic circuit 91A, the second circuit 92 may be connected to the second extrinsic circuit 92A, the third circuit 93 may be connected to the third extrinsic circuit 93A, and the fourth circuit 94 may be connected to the fourth extrinsic circuit 94A. The first circuit 91, the second circuit 92, the third circuit 93, and the fourth circuit 94 may connect to other external elements (e.g. an external circuit, not shown) by the first extrinsic circuit 91A, the second extrinsic circuit 92A, the third extrinsic circuit 93A, and the fourth extrinsic circuit 94A, respectively. For example, the first extrinsic circuit 91A, the second extrinsic circuit 92A, the third extrinsic circuit 93A, and the fourth extrinsic circuit 94A may be disposed on the surface of the bottom 20. The first extrinsic circuit 91A and the third extrinsic circuit 93A are disposed on the S, the second extrinsic circuit 92A and the fourth extrinsic circuit 94A are disposed on the second side S2, and the first extrinsic circuit 91A, the second extrinsic circuit 92A, the third extrinsic circuit 93A, and the fourth extrinsic circuit 94A extend in directions that are not perpendicular to the main axis O.

In some embodiments, the lengths of the first circuit 91, the second circuit 92, and the third circuit 93, and the fourth circuit 94 are different. For example, in the top view (e.g. FIG. 7), the length of the first circuit 91 may be the length measured from the first package 62 to the first extrinsic circuit 91A, the length of the second circuit 92 may be the length measured from the first package 62 to the second extrinsic circuit 92A, the length of the third circuit 93 may be the length measured from the second package 67 to the third extrinsic circuit 93A, and the length of the fourth circuit 94 may be the length measured from the second package 67 to the fourth extrinsic circuit 94A. In some embodiments, the length of the first circuit 91 is less than the length of the second circuit 92, the length of the third circuit 93 is greater than the length of the fourth circuit 94, the length of the first circuit 91 is greater than the length of the fourth circuit 94, and the length of the second circuit 92 is less than the length of the third circuit 93. In other words, the length of the third circuit 93>the length of the second circuit 92>the length of the first circuit 91>the length of the fourth circuit 94, but the present disclosure is not limited thereto.

In some embodiments, the circuit assembly 90 may further include a fifth circuit 95 and a sixth circuit 96. The fifth circuit 95 is used for electrically connecting the first control element 64 of the first package 62 to the first driving assembly D, such as may connect to the first driving coil 84 or the second driving coil 42. The sixth circuit 96 is used for electrically connecting the second control element 69 of the second package 67 to the first driving assembly D, such as may connect to the first driving coil 84 or the second driving coil 42. Therefore, the current passing by the first driving assembly D may be controlled, so the position of the movable portion 30 relative to the fixed portion F may be controlled to achieve auto focus or optical image stabilization.

Figure 11:
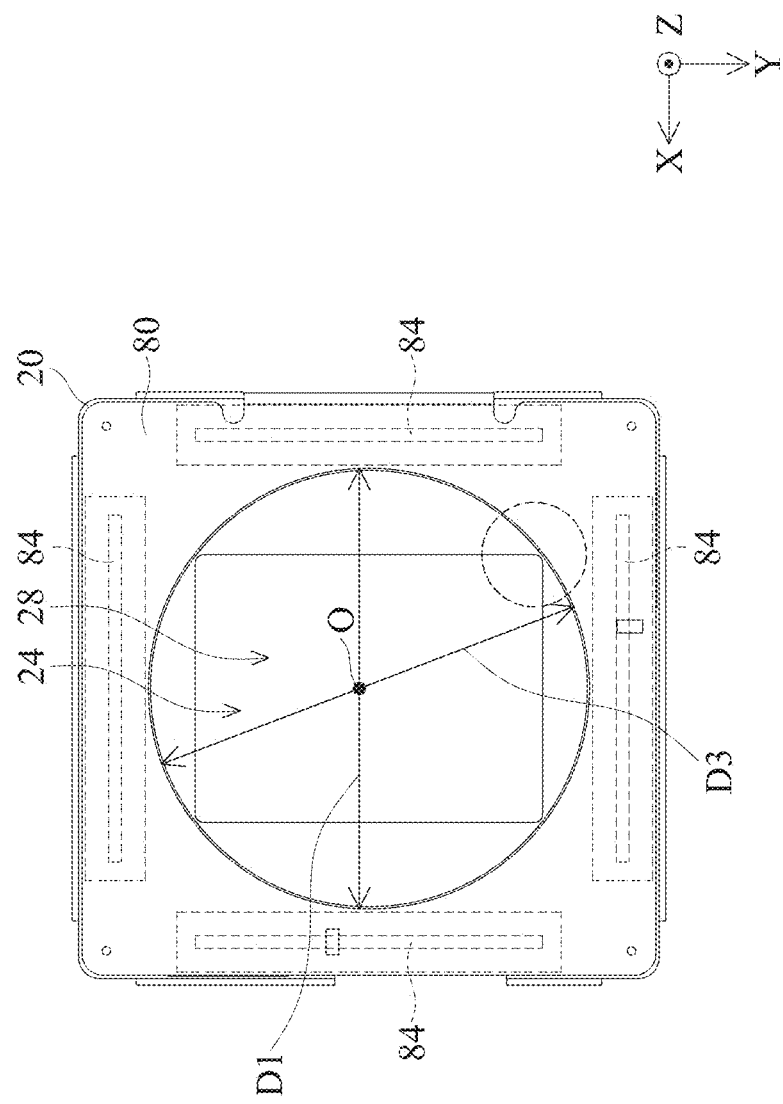
FIG. 11 is a schematic view of some elements of the optical element driving mechanism.
Figure 12:
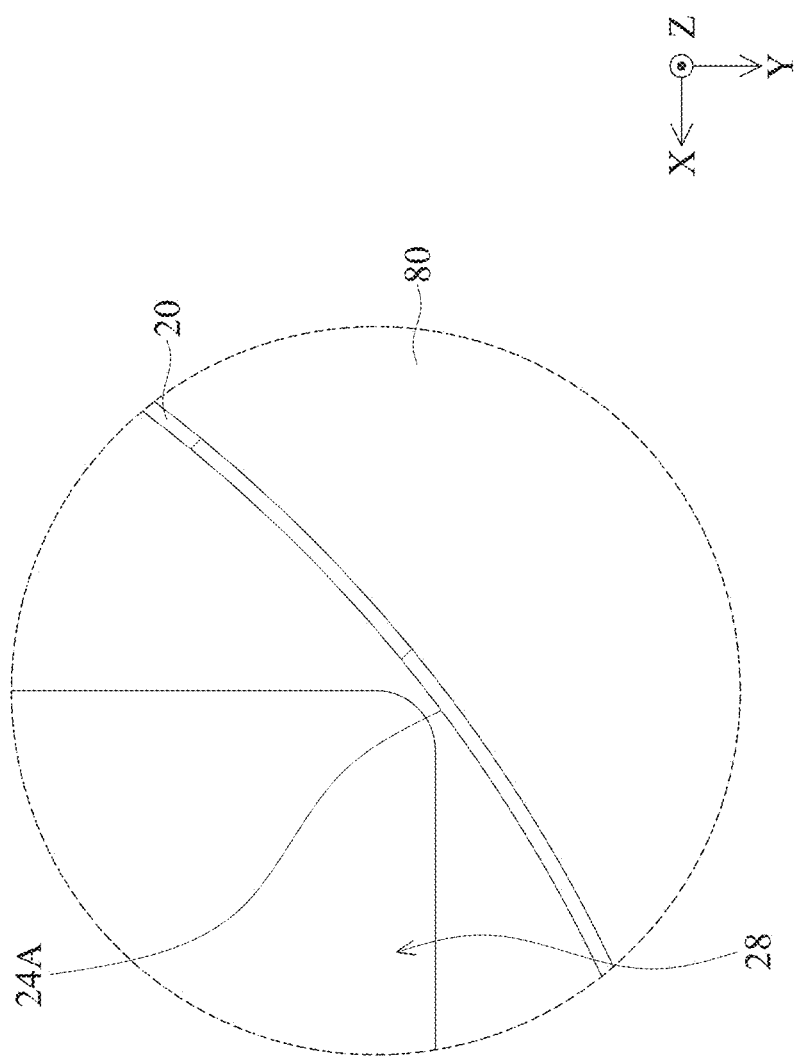
FIG. 12 is an enlarged view of FIG. 11.

FIG. 11 is a schematic view of some elements of the optical element driving mechanism 100, and FIG. 12 is an enlarged view of FIG. 11, which mainly shows the bottom 20 and the circuit component 80. As shown in FIG. 11, the circuit component 80 may include a third opening 28 corresponding to the light, and the size of the third opening 28 (the diameter D3) is greater than the size of the first opening 24 (the diameter D1). Therefore, the circuit component 80 may not shield external light, so the light can reach the first opening 24. Therefore, as shown in FIG. 12, when viewed along the main axis O, at least a portion of the bottom 20 is exposed from the third opening 28, such as the first opening 24 is exposed from the third opening 28.

Figure 13A:
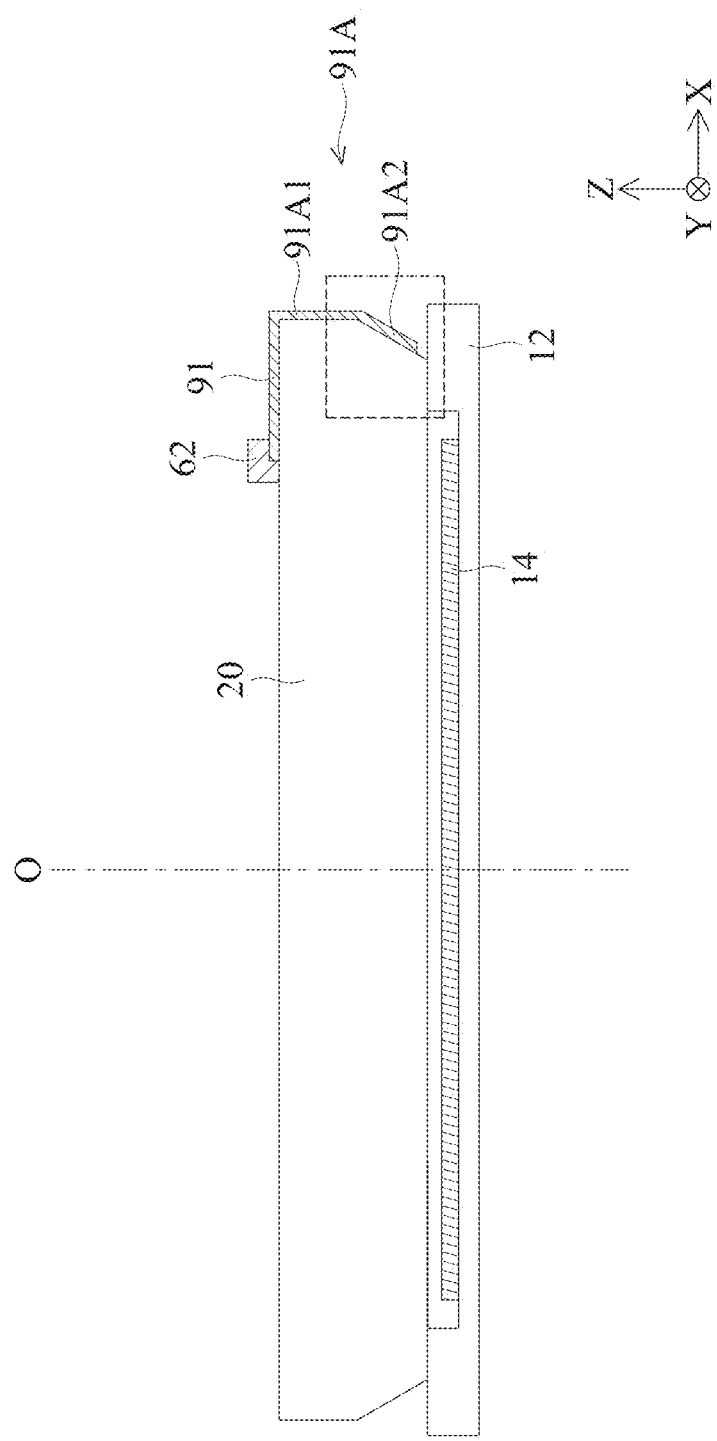
FIG. 13A is a schematic view of some elements of the optical element driving mechanism and the optical sensing module.
Figure 13B:
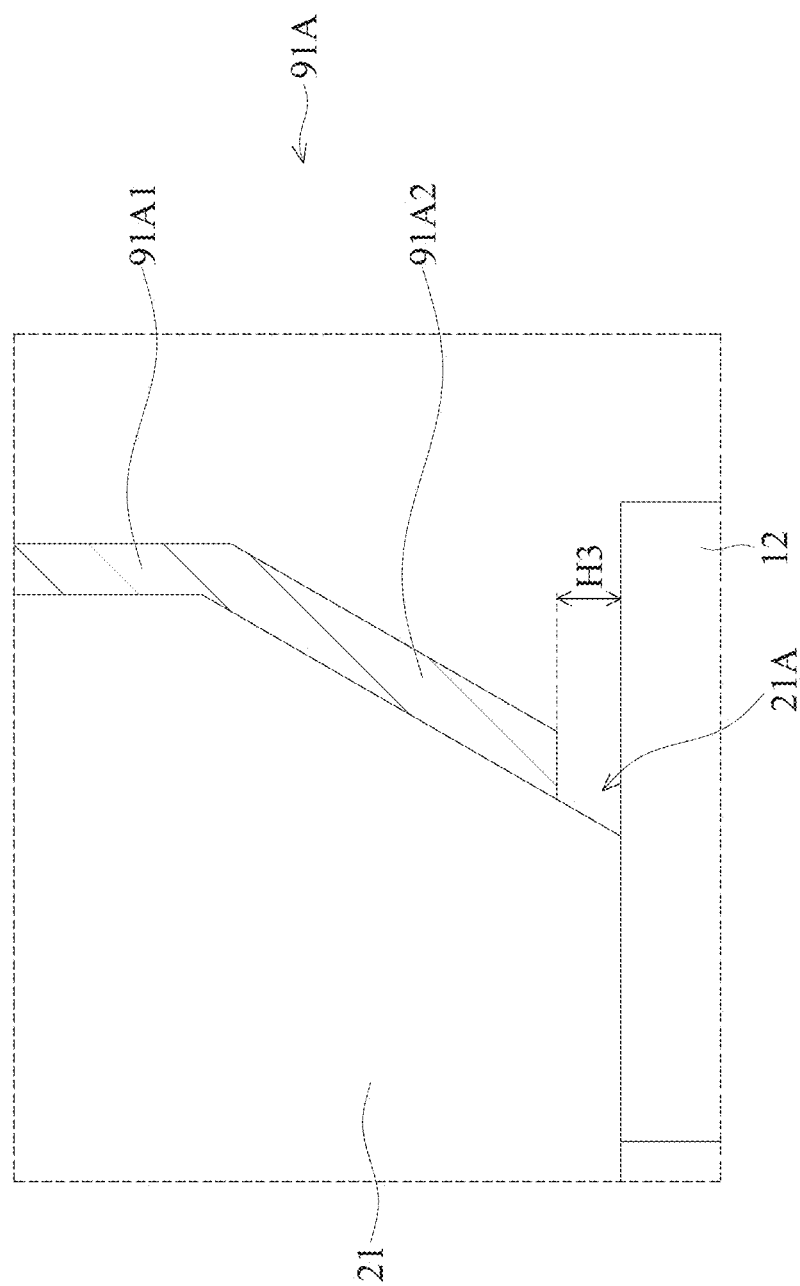
FIG. 13B is an enlarged view of FIG. 13A.

FIG. 13 is a schematic view of some elements of the optical element driving mechanism 100 and the optical sensing module I, and FIG. 13B is an enlarged view of FIG. 13A, wherein some elements are omitted for simplicity. As shown in FIG. 13A and FIG. 13B, the first extrinsic circuit 91A may include a first segment 91A1 directly connects to the first circuit 91 and a second segment 91A2 connects to the first segment 91A1. The second segment 91A2 is closer to the substrate 12 than the first segment 91A1. The first segment 91A1 and the second segment 91A2 extend in different directions, such as not parallel to each other. In some embodiments, the first segment 91A1 may extend in a direction parallel to the main axis O, and the second segment 91A2 may extend in a direction that is not parallel to the main axis O. It should be noted that in some embodiments, the main body 21 may have a shrinking structure 21A shrinking toward the main axis O and corresponding to the second segment 91A2. In other words, a portion of the second segment 91A2 may be disposed in the shrinking structure 21A to protect the second segment 91A2.

In some embodiments, the first extrinsic circuit 91A extends to the substrate 12. For example, in the Z direction (the direction that the main axis O extends), a shortest distance between the second segment 91A2 of the first extrinsic circuit 91A and the substrate 12 may be a height H3, and the height H3 may be less than 0.2 mm. In other words, the first extrinsic circuit 91A and the substrate 12 may separate from each other for a distance, but it is not limited thereto.

Figure 14A:
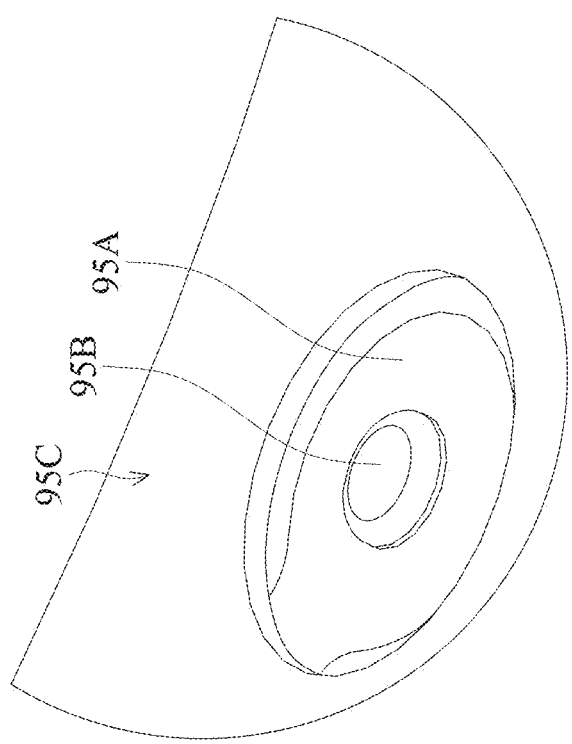
FIG. 14A shows a portion of the fifth circuit in other embodiments of the present disclosure.
Figure 14B:
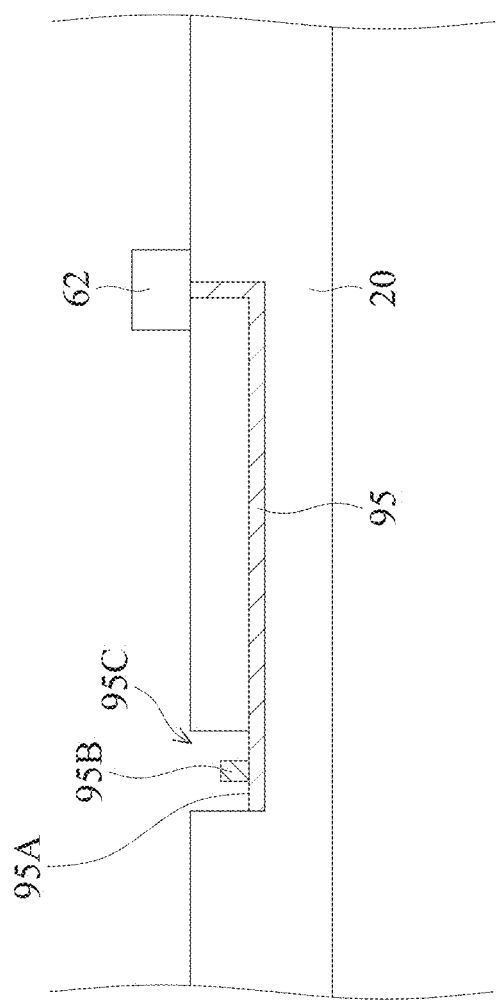
FIG. 14B is a cross-sectional view of some elements of the optical element driving mechanism in other embodiments of the present disclosure.

Although the fifth circuit 95 and the sixth circuit 96 in the embodiments of FIG. 5 to FIG. 7 are directly disposed on the bottom 20 and the entire fifth circuit 95 and the sixth circuit 96 are exposed from the bottom 20, the present disclosure is not limited thereto. For example, FIG. 14A shows a portion of the fifth circuit 95 of another embodiment of the present disclosure, and FIG. 14B shows some elements of the optical element driving mechanism 100 of another embodiment of the present disclosure, which mainly shows the fifth circuit 95 and other related elements. As shown in FIG. 14A and FIG. 14B, the fifth circuit 95 in this embodiment may be partially embedded in the bottom 20. The bottom 20 may include a fifth circuit 95C, and a first internal contact 95A and a first protruding structure 95B of the fifth circuit 95 may expose from the fifth circuit 95C. The first protruding structure 95B may protrude from the first internal contact 95A, such as protrude to the Z direction.

The material of the first protruding structure 95B may include metal, which is used for electrically connected to the first driving assembly D (e.g. the first driving coil 84 and the second driving coil 42) to protect the fifth circuit 95. In some embodiments, the height of the first internal contact 95A may be less than the depth of the fifth circuit 95C to protect the first internal contact 95A. In some embodiments, additional solder material (not shown) may be disposed in the fifth circuit 95C to allow the first protruding structure 95B electrically connecting to the first driving assembly D, and the fifth circuit 95C may be used for limiting the flowing range of the solder material. Moreover, the first protruding structure 95B may protrude from the first internal contact 95A, so the contact area between the first protruding structure 95B and the solder material may be increased to achieve better conduction. In some embodiments, the first driving assembly D may be electrically connected to the first package 62 by the fifth circuit 95, such as may be electrically connected to the first control element 64. The sixth circuit 96 may include similar structures, and is not repeated again.

In summary, an optical element driving mechanism is provided. The optical element driving mechanism includes a movable portion, a fixed portion, a first driving assembly, and a circuit assembly. The movable portion is used for connecting to an optical element. The movable portion is movable relative to the fixed portion. The first driving assembly is used for driving the movable portion to move relative to the fixed portion. The circuit assembly is used for connecting to an external circuit, and is affixed on the fixed portion. Therefore, the height of the mechanism may be reduced to achieve miniaturization. Moreover, the circuit assembly may be prevented from damaged, so the durability may be increased.

The relative positions and size relationship of the elements in the present disclosure may allow the optical element driving mechanism achieving miniaturization in specific directions or for the entire mechanism. Moreover, different optical modules may be combined with the optical element driving mechanism to further enhance optical quality, such as the quality of photographing or accuracy of depth detection. Therefore, the optical modules may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical element driving mechanism, comprising:
    a movable portion used for connecting to an optical element;
    a fixed portion comprising a bottom, wherein the movable portion is movable relative to the fixed portion, and the bottom comprises a main body and a first recess;
    a first driving assembly used for driving the movable portion to move relative to the fixed portion; and
    a circuit assembly used for connecting to an external circuit, and is affixed on the fixed portion;
    wherein:
    the main body is plate-shaped and is perpendicular to a main axis;
    the first recess comprises a first inclined surface, wherein the first inclined surface is planar and is not perpendicular to the main axis;
    the first inclined surface is not parallel to the main axis.

2. The optical element driving mechanism as claimed in claim 1, wherein the fixed portion further comprises:
    a case having a top wall and a side wall, wherein the top wall and the side wall are plate-shaped, and the top wall and the side wall are not parallel;
    wherein an accommodating space is formed between the case and the bottom and is used for accommodating the movable portion;
    wherein:
    the circuit assembly is disposed on the bottom;
    the fixed portion is used for corresponding to an optical sensing module.

3. The optical element driving mechanism as claimed in claim 2, further comprising a first sensing assembly used for detecting the movement, wherein the first sensing assembly comprises:
    a first reference object;
    a first sensing element corresponding to the first reference object; and
    a first control element used for providing a first driving signal to the first driving assembly;
    wherein:
    the first sensing element provides a first sensing signal to the first control element;
    the first sensing element and the first control element are packaged in a first package;
    the first reference object is disposed on one of the movable portion and the fixed portion, and the first package is disposed on another one of the movable portion and the fixed portion.

4. The optical element driving mechanism as claimed in claim 3, wherein:
    the material of the main body comprises plastic;
    the first recess corresponds to the first sensing element.

5. The optical element driving mechanism as claimed in claim 4, wherein the bottom further comprises:
    a first opening, wherein light passes through the first opening to reach the optical sensing module;
    a light shielding portion disposed on the first opening and corresponding to the light; and
    a second opening, wherein the light passes through the second opening to reach the optical sensing module;
    wherein:
    an angle between the first inclined surface and the main axis is between 15 degrees and 75 degrees;
    a first inner surface of the first opening is parallel to the main axis and surrounds the light;
    a chamfer of the first opening connects to the first inner surface;

the surface of the chamfer is not parallel nor perpendicular to the main axis;
the light shielding portion is adjacent to the first opening.

6. The optical element driving mechanism as claimed in claim 5, wherein:
a second inner surface of the light shielding portion is parallel to the main axis and surrounds the light;
when viewed along the main axis, the shape of the first inner surface is different from the shape of the second inner surface;
when viewed along the main axis, the maximum length of the first inner surface is greater than the maximum length of the second inner surface.

7. The optical element driving mechanism as claimed in claim 6, wherein:
in the main axis, a sum of the maximum lengths of the first inner surface and the chamfer is greater than the maximum length of the second inner surface;
the light shielding portion is between the first opening and the second opening;
a third inner surface of the second opening is parallel to the main axis and surrounds the light;
when viewed along the main axis, the shape of the first inner surface is different from the shape of the third inner surface;
in the main axis, the maximum length of the first inner surface is less than the maximum length of the third inner surface.

8. The optical element driving mechanism as claimed in claim 7, wherein:
the second opening is used for accommodating a light filter;
the light filter is affixed on the fixed portion by a first connecting element;
the light shielding comprises a connecting strengthen structure corresponding to the light filter;
the connecting strengthen structure has a recessed structure.

9. The optical element driving mechanism as claimed in claim 8, wherein:
a disposing portion of the light shielding portion corresponds to a particle-capturing element;
the material of the particle-capturing element comprises polymer;
the surface of the particle-capturing element is adhesive, and is used for capturing a particle;
the disposing portion has a recessed structure.

10. The optical element driving mechanism as claimed in claim 9, wherein the circuit assembly comprises:
a first circuit disposed on a surface of the bottom;
a second circuit disposed on the surface of the bottom;
a third circuit disposed on the surface of the bottom; and
a fourth circuit disposed on the surface of the bottom;
wherein the optical element driving mechanism further comprises a second sensing assembly, comprising a second sensing element.

11. The optical element driving mechanism as claimed in claim 10, wherein:
the first circuit is disposed on the first inclined surface;
the first circuit is electrically connected to the first sensing element;
the second circuit is electrically connected to the first sensing element;
when viewed along the main axis, the optical element driving mechanism is polygonal;
the third circuit is electrically connected to the second sensing element;

the second sensing assembly is used for detecting the movement of the movable portion relative to the fixed portion.

12. The optical element driving mechanism as claimed in claim 11, wherein:
the fourth circuit is electrically connected to the second sensing element;
the length of the first circuit is less than the length of the second circuit;
the length of the third circuit is greater than the length of the fourth circuit;
the length of the first circuit is greater than the length of the fourth circuit;
the length of the second circuit is less than the length of the third circuit.

13. The optical element driving mechanism as claimed in claim 12, wherein the circuit assembly further comprises:
a first extrinsic circuit extending in a direction that is not perpendicular to the main axis;
a second extrinsic circuit extending in a direction that is not perpendicular to the main axis;
a third extrinsic circuit extending in a direction that is not perpendicular to the main axis;
a fourth extrinsic circuit extending in a direction that is not perpendicular to the main axis.

14. The optical element driving mechanism as claimed in claim 13, wherein:
the first extrinsic circuit is disposed on a surface of the bottom;
the first circuit is electrically connected to an external circuit through the first extrinsic circuit;
the second extrinsic circuit is disposed on a surface of the bottom;
the second circuit is electrically connected to the external circuit through the second extrinsic circuit.

15. The optical element driving mechanism as claimed in claim 14, wherein:
when viewed along the main axis, the first extrinsic circuit is disposed on a first side of the optical element driving mechanism;
when viewed along the main axis, the second extrinsic circuit is disposed on a second side of the optical element driving mechanism;
the third extrinsic circuit is disposed on a surface of the bottom;
when viewed along the main axis, the third extrinsic circuit is disposed on the first side;
the third circuit is electrically connected to the external circuit through the third extrinsic circuit.

16. The optical element driving mechanism as claimed in claim 15, wherein:
the fourth extrinsic circuit is disposed on a surface of the bottom;
the fourth circuit is electrically connected to the external circuit through the fourth extrinsic circuit;
when viewed along the main axis, the fourth extrinsic circuit is disposed on the second side;
when viewed along the main axis, the first sensing element is disposed at a third side of the optical element driving mechanism;
the first side is parallel to the second side;
the third side is not parallel to the second side;
when viewed along the main axis, the second sensing element is disposed on the second side.

17. The optical element driving mechanism as claimed in claim 16, wherein the circuit assembly further comprises:

a fifth circuit electrically connected to the first driving assembly;

a first internal contact exposed from a recess of the bottom; and a first protruding structure protruding from the first internal contact.

18. The optical element driving mechanism as claimed in claim 17, wherein:

the material of the first protruding structure comprises metal;

the first driving assembly is electrically connected to the fifth circuit through the first protruding structure;

the first driving assembly is electrically connected to the first control element through the fifth circuit.

19. The optical element driving mechanism as claimed in claim 18, wherein:

the optical sensing module comprises a substrate and an optical sensor;

the bottom is disposed on the substrate;

the optical sensor is disposed on the substrate;

the first extrinsic circuit extends to the substrate;

the first extrinsic circuit comprises a first segment and a second segment that are not parallel each other;

the second segment is closer to the substrate than the first segment;

the main body has a shrinking structure corresponding to the second segment.

20. The optical element driving mechanism as claimed in claim 19, further comprising a circuit component;

wherein:

the first driving assembly comprises a first coil;

the circuit component is used for accommodating the first coil;

the circuit component comprises a third opening corresponding to the light;

when viewed along the main axis, the third opening is greater than the first opening;

the bottom is in contact with the substrate;

a minimum distance between the first extrinsic circuit and the substrate is less than 0.2 mm;

the first segment is parallel to the main axis;

the second segment is not parallel to the main axis.

* * * * *